United States Patent [19]

Sakamura et al.

[11] Patent Number: 5,398,319
[45] Date of Patent: Mar. 14, 1995

[54] MICROPROCESSOR HAVING APPARATUS FOR DYNAMICALLY CONTROLLING A KIND OF OPERATION TO BE PERFORMED BY INSTRUCTIONS TO BE EXECUTED

[75] Inventors: Ken Sakamura, No. 105, 12-30 Shiroganedai 3-chome, Minato-ku, Tokyo; Ikuya Kawasaki, Kodaira; Atsushi Hasegawa, Koganei; Kazuhiko Iwasaki, Hachiohji; Motonobu Tonomura, Kodaira, all of Japan

[73] Assignees: Ken Sakamura; Hitachi Ltd.; Hitachi Microcomputer Engineering Ltd., Tokyo, Japan

[21] Appl. No.: 943,981

[22] Filed: Sep. 11, 1992

Related U.S. Application Data

[63] Continuation of Ser. No. 630,727, Dec. 20, 1990, abandoned, which is a continuation of Ser. No. 399,449, Aug. 28, 1989, abandoned, which is a continuation of Ser. No. 86,868, Aug. 19, 1987, abandoned.

[30] Foreign Application Priority Data

Aug. 27, 1986 [JP] Japan .................................. 61-198871

[51] Int. Cl.⁶ .................................................. G06F 9/30
[52] U.S. Cl. .................................... 395/375; 395/775; 364/DIG. 1; 364/262.4; 364/261; 364/261.1; 364/255; 364/247
[58] Field of Search .................................. 395/375, 775

[56] References Cited

U.S. PATENT DOCUMENTS

| | | | |
|---|---|---|---|
| 3,411,147 | 11/1968 | Packard | 364/200 |
| 3,982,229 | 9/1976 | Rouse et al. | 364/200 |
| 4,194,241 | 3/1980 | Mager | 364/200 |
| 4,250,545 | 2/1981 | Blahut et al. | 364/200 |
| 4,293,907 | 10/1981 | Huang et al. | 364/200 |
| 4,298,933 | 11/1981 | Shimokawa et al. | 364/200 |
| 4,373,180 | 2/1983 | Linde | 364/DIG. 1 |
| 4,441,153 | 4/1984 | Bullions, III et al. | 364/200 |
| 4,471,433 | 9/1984 | Matsumoto et al. | 364/200 |
| 4,525,776 | 6/1985 | Eldumiati et al. | 364/200 |
| 4,763,253 | 8/1988 | Bluhar et al. | 364/200 |
| 4,827,402 | 5/1989 | Wada | 364/200 |

OTHER PUBLICATIONS

IBM Tech Discl. Bulletin, vol. 8, No. 12, May 1966 "Call Instruction" Written by J. Dirac p. 1751.
IBM Tech. Discl. Bulletin, "Tagged Vector Data Registers", A. G. Liles, Jr., vol. 22, No. 7, Dec. 1979, pp. 3011-3012.
IBM Tech. Discl. Bulletin, "Decimal Instruction Set for IBM Service/Processors", M. M. Bhansali et al., vol. 24, No. 7B, Dec. 1981 pp. 3737-3738.

*Primary Examiner*—Eddie P. Chan
*Attorney, Agent, or Firm*—Antonelli, Terry, Stout & Kraus

[57] ABSTRACT

A microprocessor including instruction decoding apparatus, instruction execution apparatus and information holding apparatus. The microprocessor performs a first step of storing information specifying the kind of operation to be performed by the instruction execution apparatus, upon execution of a first instruction, in the information holding apparatus and a second step of causing the instruction execution apparatus to perform the kind of operation specified by information stored in the information holding apparatus when a second instruction is decoded and includes information specifying that the operation to be performed by the instruction execution apparatus is the kind of operation specified by the information stored in the information holding apparatus.

22 Claims, 7 Drawing Sheets

FIG. 6A FIRST STAGE

FIG. 6B SECOND STAGE

| | |
|---|---|
| INPUT THE Rx VALUE AND 0 TO AU AND STORE RESULT IN AUO. | ~S01 |
| TRANSFER THE VALUE OF AUO TO AOR AND INSTRUCT I/O TO FETCH REQUEST AT THE SAME TIME. | ~S02 |
| CONFIRM IF DATA FETCHED TO I/O IS DETERMINED. ADD Ra AND 0 BY AU AND STORE THE RESULT IN AUO. | ~S03 |
| TRANSFER THE AUO VALUE TO AOR AND AOT AND FURTHER TO DTE0 THROUGH BC BUS. INPUT 0 AND DiR VALUE TO AU THROUGH BB BUS AND AT THE SAME TIME, CODE-EXPAND AND ADD THE VALUES AND STORE RESULT IN AUO. INPUT Ry VALUE TO FB THROUGH BA BUS, WHERE UPPER BITS ARE MASKED SO THAT ONLY LOWER FIVE BITS CAN BE SEEN. STORE RESULT IN FBO. | ~S04 |
| TRANSFER AUO VALUE TO DTE1 THROUGH SC BUS. ADD SUO AND VALUE OBTAINED BY SHIFTING TO LEFT THE DTE0 VALUE BY THREE BITS BY AU AND STORE RESULT IN AUO. | ~S05 |
| TRANSFER THE AUO VALUE TO AOT. ADD THE DTE0 VALUE INPUTTED THROUGH BA BUS AND THE VALUE OBTAINED BY SHIFTING TO RIGHT BY THREE BITS THE DTE1 VALUE INPUTTED THROUGH BB BUS, AND STORE THE VALUE OBTAINED BY MASKING THE LOWER TWO BITS OF THE RESULT IN AUO. TRANSFER THE FBO VALUE TO DTE3 THROUGH BC BUS. | ~S06 |
| TRANSFER THE AUO VALUE TO AOR AND AT THE SAME TIME, INSTRUCT FETCH REQUEST TO I/O. FURTHER, TRANSFER THE AUO VALUE TO DTE2 THROUGH BC BUS. INPUT THE AOT VALUE TO FB THROUGH BA BUS, AND MASK THE UPPER BITS SO THAT ONLY LOWER FIVE BITS CAN BE SEEN. STORE THE RESULT IN FBO. | ~S07 |
| TRANSFER THE FBO VALUE TO DTE1 THROUGH BC BUS. ADD THE DTE3 VALUE INPUTTED THROUGH BA BUS AND THE FBO VALUE INPUTTED THROUGH BB BUS BY ALU AND STORE THE RESULT IN ALUO. SET CONSTANT "33" TO OBS. CONFIRM IF DATA FETCHED TO I/O IS CONFIRMED. | ~S08 |
| TRANSFER THE DiR VALUE DETERMINED BY MEMORY FETCH TO DTE2 THROUGH BC BUS. SUBTRACT THE ALUO VALUE AND CONSTANT VALUE OF CBS INPUTTED THROUGH ECB BUS AND STORE RESULT IN ALUO. INSTRUCT RIGHTWARD DIRECTION TO BCNT AND INPUT THE FBO VALUE THROUGH BA BUS. | ~S09 |
| INPUT THE DTE2 VALUE AND 0 TO BSF THROUGH BB BUS AND STORE RESULT IN BSFO. INSTRUCT RIGHTWARD DIRECTION TO BCNT AND INPUT THE DTE3 VALUE THROUGH BA BUS. | ~S10 |
| INPUT 0 AND THE BSFO VALUE TO BSF TO MAKE TEST AND STORE RESULT IN BSFO. | ~S11 |
| STORE THE BSFO VALUE IN Rb THROUGH BC BUS. | ~S12 |

MICROPROCESSOR HAVING APPARATUS FOR DYNAMICALLY CONTROLLING A KIND OF OPERATION TO BE PERFORMED BY INSTRUCTIONS TO BE EXECUTED

This application is a continuation application of Ser. No. 07/630,727, filed Dec. 20, 1990, now abandoned, which is a continuation of application Ser. No. 07/399,499, filed Aug. 28, 1989, now abandoned, which is a continuation of application Ser. No. 07/086,868, filed Aug. 19, 1987, now abandoned.

BACKGROUND OF THE INVENTION

Conventionally, microprocessors are equipped with various logical operation instructions such as logical product (AND), logical sum (OR), exclusive-or (XOR), and the like in addition to arithmetical operation instructions such as addition, subtraction, multiplication, division, comparison and the like.

In the instruction system of conventional microprocessors, the kind of operation is designated by an instruction (an operation code). In other words, an instruction is prepared for each operation, and the kind of operation is fixed in the program and cannot be changed unlike data. Therefore, when the program is stored in ROM (Read-Only Memory), it is not possible to change the operation.

When graphic processing such as so-called "smeara-way" or "see-through" processing, is carried out by performing logical operations on data in a bit field, in computer graphics, for example, a program could be developed more easily if the kind of operation can be determined dynamically while viewing a display surface.

However, in conventional microprocessors wherein the instruction is determined in accordance with the kind of operation, the operation instruction in a program must be re-written in order to change the content of the operation processing, and so the program does not have flexibility.

On the other hand, in order to determine the next operation to be performed or the kind of operation on the basis of a result obtained by execution of a certain preceding instruction, those instructions or operations which might be executed next must be listed up. In other words, a program must be prepared in such a manner as to select one instruction or one operation among those listed up on the basis of the result obtained by execution of the certain instruction. Therefore, in addition to low flexibility of program, another problem develops in that instruction selection processing must be performed and so high speed operation is limited when executing a series of instructions.

SUMMARY OF THE INVENTION

It is therefore an object of the present invention to provide an instruction system which provides a program in a microcomputer system with flexibility and which makes it possible to develop easily a program for graphic processing, for example.

The above and other objects and novel features of the present invention will become more apparent from the following description taken in conjunction with the accompanying drawings.

Among the inventions disclosed herein, the following will illustrate a typical example.

Namely, the present invention executes a desired operation using an instruction to which operand information for designating the kind of operation is added outside or into an operation designation portion Storing therein a common operation code of "operations" (broad sense of the word) which provides the kind of operation as one of the operands.

According to the means described above, the content of the operand for designating the kind of operation on the basis of a result of execution of a certain instruction is set in advance and the operation can be executed by the next instruction in accordance with the content of the operand described above. Therefore, the kind of operation can be changed dynamically in the program, and the above-mentioned objects of providing flexibility to a program and developing easily a program for graphic processing can be accomplished.

BRIEF DESCRIPTION OF THE DRAWINGS

FIG. 8 shows an execution sequence useful for explaining in more detail a step S1 in FIG. 7;

DESCRIPTION OF THE PREFERRED EMBODIMENTS

Hereinafter, an embodiment of the present invention which is applied to an instruction relating to handling of data from an arbitrary bit to an arbitrary bit inside a memory called a "bit field" (hereinafter referred to as a "bit field instruction") will be described.

Figure 1:
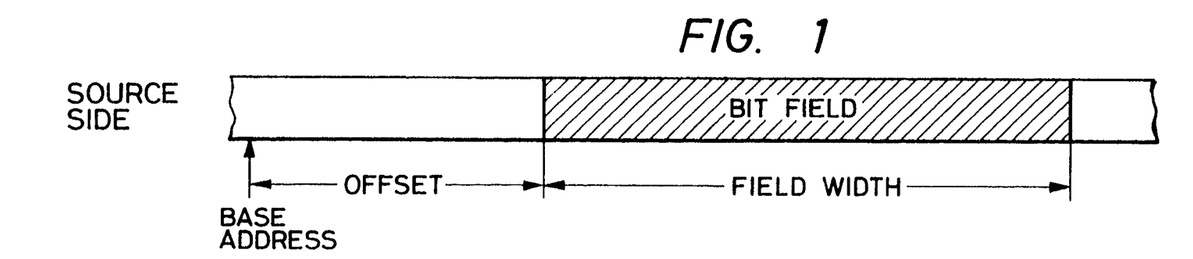
FIGS. 1 and 2 are explanatory views showing structural examples of inter-bit fields in bit field operation instructions to which the present invention is applied.
Figure 2:
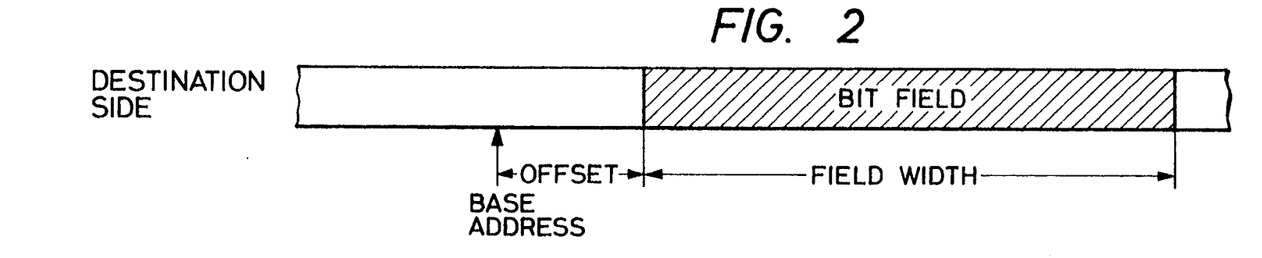

As shown in FIGS. 1 and 2 of the accompanying drawings, the bit field instruction provides as operands three values, that is, a base address BA, an offset Off from this base address and a field width WD representing field length (bit number) and designates a desired field inside a memory in order to perform logical operation processing such as AND and OR. Incidentally, such a bit field instruction is already provided in microprocessors such as a Motorola MC6802. In this bit field instruction, the base address BA, operands following the operation code.

This embodiment designates the kind of operation, too, by the operand. As a definite method of designating the operation by the operand, the embodiment shown in FIG. 9A, for example, uses a register direct addressing system having a register number. In other words, a code representing the kind of operations is put in advance into a predetermined register R5 and the register number storing the code and an addressing mode are put into the operand. In the embodiment shown in FIG. 9B, on the other hand, information to the effect that the kind of operation is to be determined on the basis of the content of the register R5 is added to the operation code. When the instruction shown in FIG. 9A or 9B is executed, the code representing the kind of operation is in advance read out as data from the memory by a MOVE instruction or the like and stored in the predetermined register R5.

Similarly, the values stored in predetermined registers are used for the base address BA, the offset Off and the field width WD to execute an instruction.

Figure 9A:
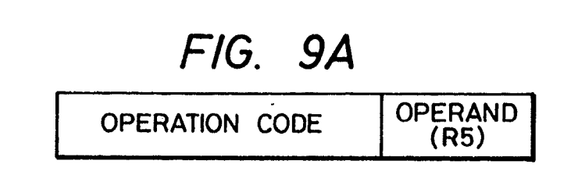
FIGS. 9A and 9B shows examples of instruction formarts to which the present invention is applied.
Figure 9B:
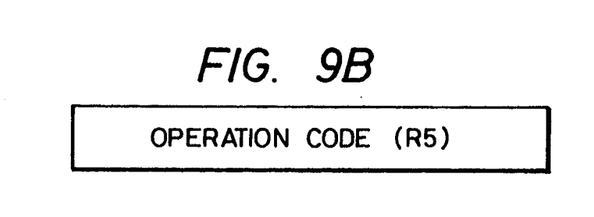

The instruction shown in FIG. 9A or 9B is, for example, a bit field instruction which is a so-called "inter-bit field operation" instruction which calculates logic between the data of a certain bit field (source side) and the data of another bit field (destination side) and puts the logic into the bit field on the destination side. Execution of this instruction needs registers for storing the base address BAs, offset Offs and field width WDs for designating the bit field on the source side, registers for storing the base address BAd, offset OFFd and base width WDd for designating the bit field on the destination side and a register for storing the code for designating the kind of operation. However, in the instruction which calculates the logic between these two bit fields, the field width WD is essentially the same and for this reason, one register can be used in common.

Table 1 shows one example of the relation between the registers used for the inter-bit field operation instruction and the data stored in the registers.

TABLE 1

| R0 | BA of bit field on source side |
|----|--------------------------------|
| R1 | Off of bit field on source side |
| R2 | field width (WD) |
| R3 | BA of bit field on destination side |
| R4 | Off of bit field on destination side |
| R5 | kind of operation |

Symbol BA represents the base address and Off represents the offset.

Table 2 illustrates the kinds of operations designated by the register R5 described above.

TABLE 2

| | Kind of operations | Content |
|---|---|---|
| 1 | True | 1 ⟶ dest |
| 2 | False | 0 ⟶ dest |
| 3 | NotDest | $\overline{\text{dest}}$ ⟶ dest |
| 4 | Dest | dest ⟶ dest |
| 5 | NotSrc | $\overline{\text{src}}$ ⟶ dest |
| 6 | Src | src ⟶ dest |
| 7 | AND | dest.and.src ⟶ dest |
| 8 | Or | dest.or.src ⟶ dest |
| 9 | Xor | dest.xor.src ⟶ dest |
| 10 | NotAnd | $\overline{\text{dest.and.src}}$ ⟶ dest |

TABLE 2-continued

| | Kind of operations | Content |
|---|---|---|
| 11 | NotOr | $\overline{\text{dest.or.sec}}$ ⟶ dest |
| 12 | AndNot | dest.and.$\overline{\text{src}}$ ⟶ dest |
| 13 | OrNot | dest.or.$\overline{\text{src}}$ ⟶ dest |
| 14 | NotAndNot | $\overline{\text{dest}}$.and.src ⟶ dest |
| 15 | NotOrNot | $\overline{\text{dest}}$.or.$\overline{\text{src}}$ ⟶ dest |
| 16 | NotXor | $\overline{\text{dest.xor.src}}$ ⟶ dest |

In Table 2 above, the operation represented by True means the operation which makes all the bits "1" in the bit field on the destination side and the operation False makes all the bits "0" in the bit field on the destination side. The operation NotDest represents the operation which inverts the data of all the bits of the bit field on the destination side and returns them into the original bit field and the operation Dest returns the data in the bit field on the destination side to the original bit field. The operation Not inverts the data of all the bits in the bit field on the source side and puts them into the bit field on the destination side and the operation Src puts the data in the bit field on the source side into the bit field on the destination side.

Furthermore, the operation AND calculates the logical product between the data of the bit fields on the source and destination sides and puts the result into the bit field on the destination side and the operation Or calculates the logical sum between the data in the bit fields on the source and destination sides and puts the result into the bit field on the destination side. The operation Xor calculates the exclusive-or between the data in the bit fields on the source and destination sides and puts the result into the bit field on the destination side. The operation NotAnd calculates the logical product between the inverted value of the data in the bit field on the destination side and the data in the bit field on the source side and puts the result into the bit field on the destination side. The operation NotOr calculates the logical sum between the inverted value of the data in the bit field on the destination side and the data in the bit field on the source side and puts the result into the bit field on the destination side, and the operation AndNot calculates the logical product between the data in the bit field on the destination side and the inverted value of the data in the bit field on the source side and puts the result into the bit field on the destination side. The operation OrNot calculates the logical sum between the data in the bit field on the destination side and the inverted value of the data in the bit field on the source side and puts the result into the bit field on the destination side, and the operation NotAndNot calculates the logical product between the inverted values of the data in the bit fields on the source and destination sides and puts the result into the bit field on the destination side, and the operation NotOrNot calculates the logical sum between the inverted values of the data in the bit fields on the source and destination sides and puts the results into the bit field on the destination side. The operation NotXor calculates the exclusive-or between the inverted value of the data in the bit field on the destination side and the data in the bit field on the source side and puts the result into the bit field on the destination side.

The various operations described above can be distinguished, for example, by the lower four bits of the register R5.

When the inter-bit field operation instruction described above is used, the kind of operation is given as one of the operands so that the kind of operation can be changed dynamically during execution of the program by merely changing the data in the memory or by changing the data loaded from the memory. However, it is necessary to put the base address and the offset given in advance as the operands and the code representing the kind of operations into the predetermined registers ($R_0$–$T_5$).

Figure 3:
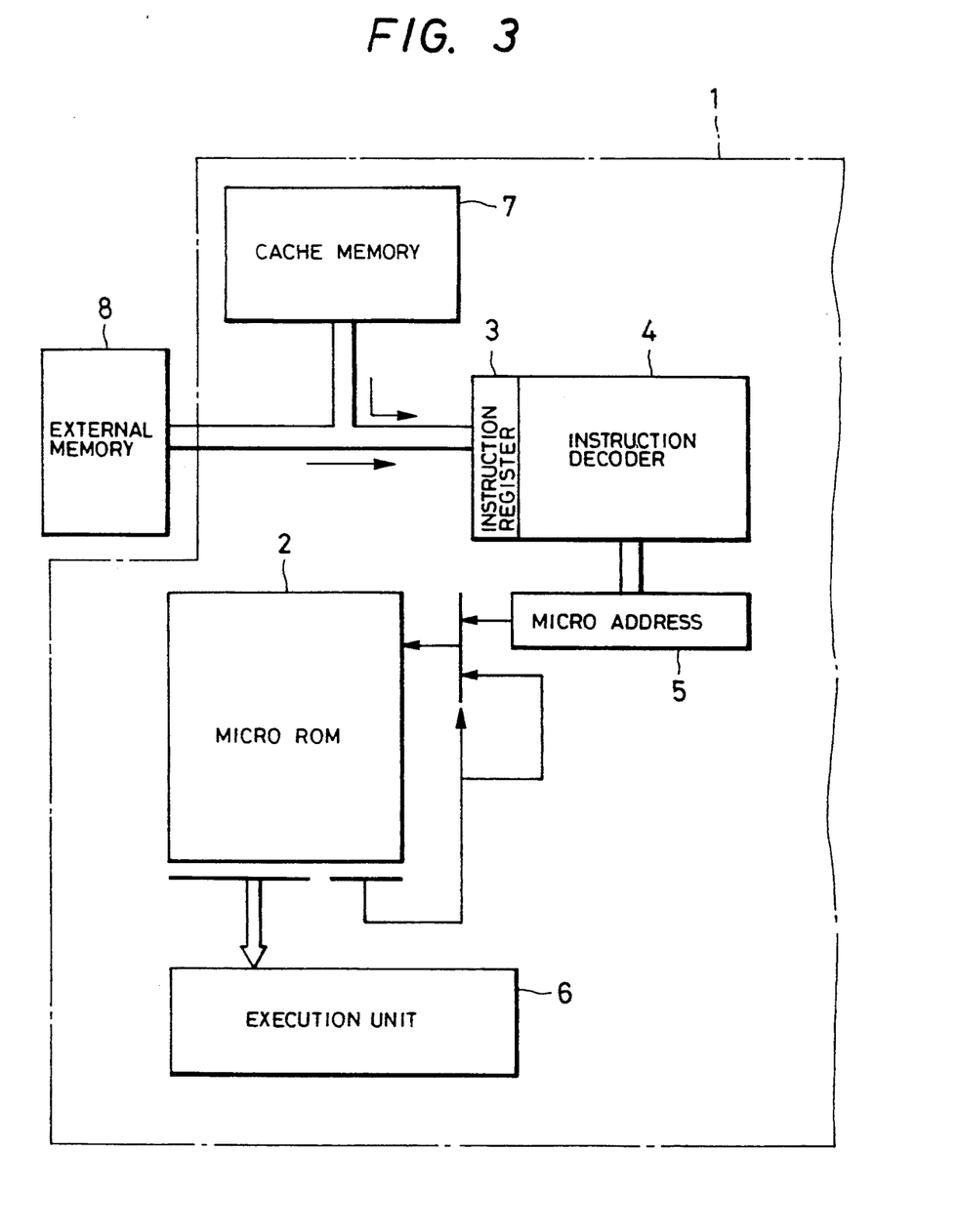
FIG. 3 is a block diagram showing a structural example of a microprocessor for executing the bit field instruction in accordance with the present invention.

FIG. 3 shows an example of a graphic display program using the inter-bit field operation instruction (abbreviated, "BVMAP") described above.

TABLE 3

| LOOP | MOVE (R10) +, R0 |
|---|---|
| | MOVE (R11) +, R1 |
| | MOVE (R12) +, R2 |
| | MOVE (R13) +, R3 |
| | MOVE (R14) +, R4 |
| | MOVE (R15) +, R5 |
| | BVMPA |
| | SUB LINE, −1 |
| | BNE LOOP |

The content of the processing of the program described above is to execute repeatedly the inter-bit field operation instruction represented by BVMAP by changing the contents of the registers R0 to R5 by post increment for each line. For example, MOVE (R10) +1, R0 is an instruction which updates the content of the register R10 and stores it in the register R0. The instruction SUB LINE, −1 is an instruction which substracts 1 from the total line number.

Therefore, in the program described above, when the kind of operation stored in the register R5 is executed repeatedly while changing it every time, the result of bit field processing having a different operation content for each line is displayed on the display surface as a picture.

In the embodiment described above, the kind of operation is changed by changing the content of the register R5 for each line. However, the present invention is not particularly limited to this embodiment. For example, the program can be executed without updating the content of the register R5 by storing the result obtained by a program, that has been executed before the program described above, in the register R5. In this manner, the kind of operation can be changed dynamically during execution of the program.

Figure 7:
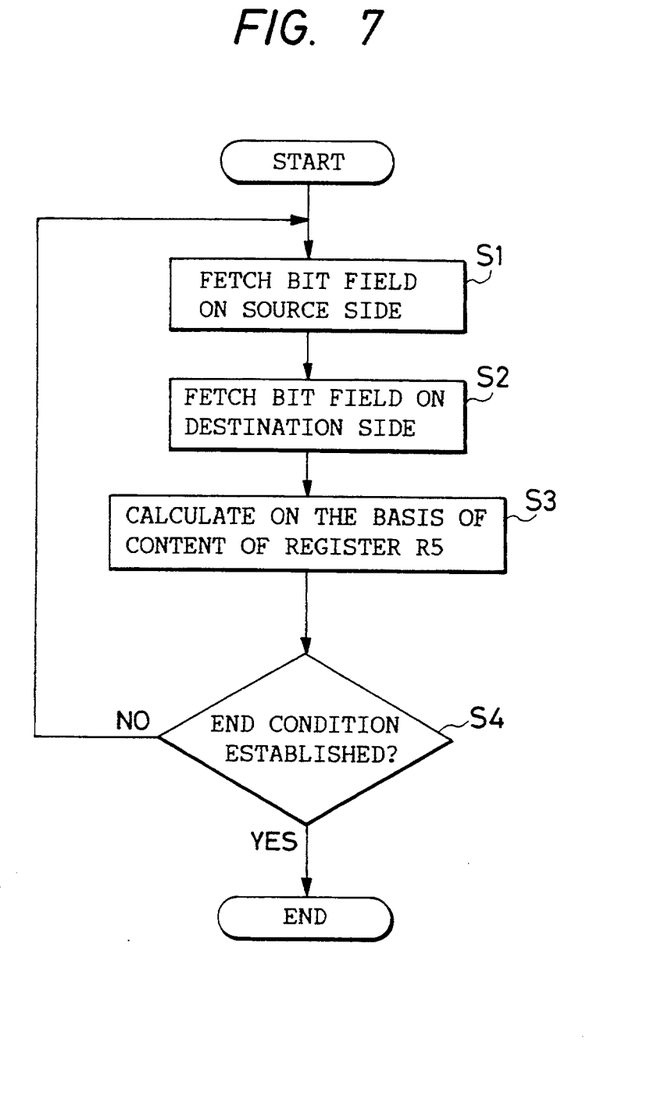
FIG. 7 is a flowchart showing the execution sequence of the inter-bit field operation instruction to which the present invention is applied.

FIG. 7 shows a flowchart of the inter-bit field operation instruction BVMAP. The bit field on the source side is fetched by use of the contents of the registers R0, R1 and R2 at step S1. Then, the bit field on the destination side is fetched by use of the contents of the registers R2, R3 and R4 at step S2. The operation is executed at step 3 by use of the content of the register R5. The end condition is judged at step S4. Namely, if the end condition is in agreement, the instruction is finished and if not, the flow returns to the step S1. The bit number of the data that can be fetched once is determined by the data bus length of the microprocessor. Therefore, in order to fetch all the bit fields and to perform calculation on the basis of the bit fields, it is sometimes necessary to carry out repeatedly and several times the steps S1 to S3.

In the embodiment described above, the instruction relating to handling of mutual data of the two bit fields has been described, by way of example, as the bit field instruction. However, other bit field instructions suitable for graphic processing include an instruction for storing repeatedly the bit patterns of arbitrary registers for the bit field designated by the base address, the offset and the field width, for example. When such an instruction is used, a kind of smear-away operation which fills up an arbitrary area or areas on the picture surface by arbitrary patterns (basic figures constituting a pattern) can be conducted easily.

FIG. 3 shows one example of the hardware construction of the microprocessor operating in accordance with the instruction system having the bit field instruction of the embodiment described above.

The microprocessor of this embodiment is equipped with a control unit of a microprogram control system. In other words, an LSI chip 1 constituting the microprocessor includes a micro-ROM (Read-Only Memory) 2 storing therein a microprogram. Access to this micro-ROM 2 is made by a micro address generation circuit 5 and micro instructions constituting the micro program are sequentially outputted.

A signal obtained by decoding the code of an instruction fetched to an instruction register 3 by an instruction decoder 4 is supplied to the micro address generation circuit 5. The micro address generation circuit 5 generates the corresponding micro address on the basis of this signal and supplies it to the micro-ROM 2. Accordingly, the first micro instruction of a series of micro instruction of a micro instruction group for executing the decoded instruction is read out. This micro instruction code generates a control signal for an execution unit 6 consisting of various registers, data buffers and an arithmetic-and-logic unit. The general-purpose registers R0 to R15 used in the embodiment described above are contained in this execution unit 6.

The read-out operation of the second micro instruction et seq of the series of micro instructions of the micro instruction group corresponding to the decoded instruction is effected as the code of the next address field of the micro instruction that has been read out immediately before is supplied to the micro-ROM 2, on the basis of the next address in the micro instruction immediately before and the address from the micro address generation circuit 4. In this manner, the series of micro instructions are read out to form the control signal, which then controls the execution unit 6 to let it execute the micro instruction.

Though not particularly limitative, this embodiment employs a buffer memory system. A CACHE memory 7 is disposed in the micro processor LSI and program data having high access frequency among the data inside an external memory 8 are registered to the CACHE memory 7 in order to improve the acceptance speed of the program.

Incidentally, the embodiment given above deals with the application of the invention to the bit field instruction suitable for graphic processing by way of example, but the application to other calculation instructions can be of course made.

In the embodiment given above, the kind of operation designated by the operand is limited to the logical operation such as AND and OR, but as to a instructions for executing the arithmetic operation, it is likewise possible to make the operation code the same and to designate the kind of operation by the operand.

Figure 4:
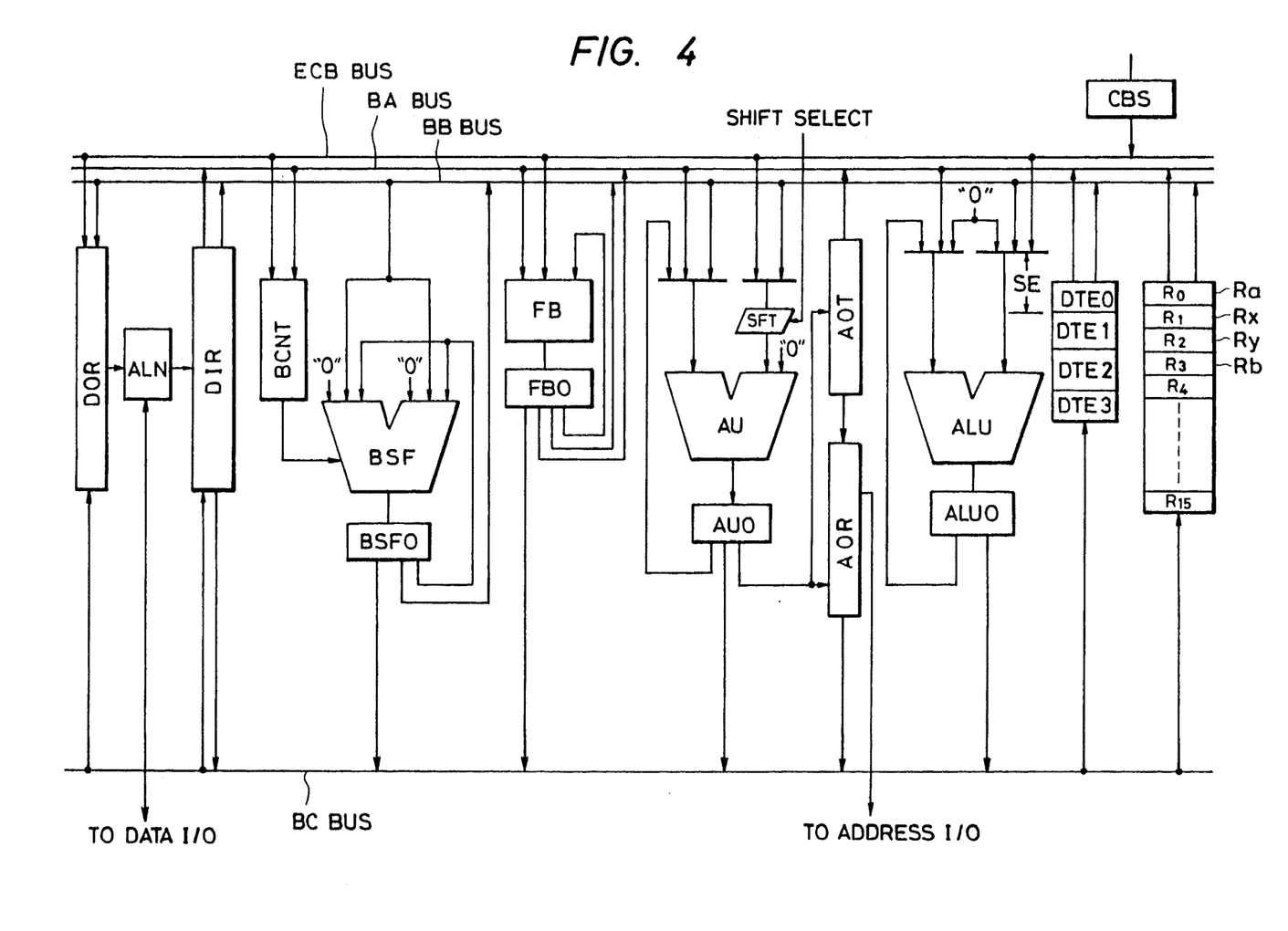
FIG. 4 is a block diagram showing an internal structure of the execution unit shown in FIG. 3.

FIG. 4 shows the internal arrangement of the execution unit 6 shown in FIG. 3.

In the execution unit shown in FIG. 4, circuit symbol CBS represents a register for latching extension data such as the offset value, the field width, and the like; DOR is a data output register for latching the data to be stored in a memory; DIR is a data input register for latching the data read out from the memory; and ALN is an aligner for aligning the data that is inputted and outputted. This aligner ALN is connected to external data buses through a data I/O interface (not shown in the drawing).

Circuit symbol BSF represents a barrel shifter which extracts an arbitrary 32 bits among 64-bit data that are inputted simultaneously in 32-bit units. This barrel shifter BSF is constructed in such a manner that a constant such as 0 can be directly inputted. BCNT represents a barrel shifter counter for designating the extraction position to the barrel shifter BSF, and BSFO is a register for latching the output of the barrel shifter BSF. Symbol FB represents a function block for masking and outputting the upper 27 bits by inputting the data, and FBO is a register for latching the output of the function block FB.

Circuit symbol AU represents an address calculation unit for calculating the effective address. This address calculation unit AU is constructed in such a manner that a constant such as 0 can be directly inputted. Symbol AUO represents a register for latching the output of this address calculation unit AU, SFT is a shifter for shifting the data before calculation by the calculation unit, AOT is a latch circuit for temporarily holding the value of the register AUO storing therein the result of calculation when that value is transferred to later-appearing temporary registers DTE0-DTE3, and AOR is an address output register for temporarily holding the address value of the register AUO when the address value is outputted to the outside. This register AOR is connected to the external address bus through an address I/O interface (not shown).

On the other hand, circuit symbol ALU represents an arithmetic-and-logic unit for executing the fundamental arithmetic operation such as addition, subtraction, etc. and the logical operation, ALUO is a register for latching the result of calculation by the arithmetic-and-logic unit ALU and DTE0-DTE3 are register groups which are for latching the temporary values and cannot be seen from the outside (or not open to users). Symbols R0, R1, . . . , R15 represent registers of a general-purpose register group which are open to users. The various registers, latch circuits, calculators, and the like described above are connected to one another through four kinds of buses ECB, BA, BB and BC and are operated sequentially by the control signal supplied from the control unit consisting of micro ROM to execute the corresponding micro instruction.

In accordance with the present invention, the arithmetic-and-logic unit ALU and the like can be controlled by the content of the general-purpose register such as the register R5.

Figure 5:
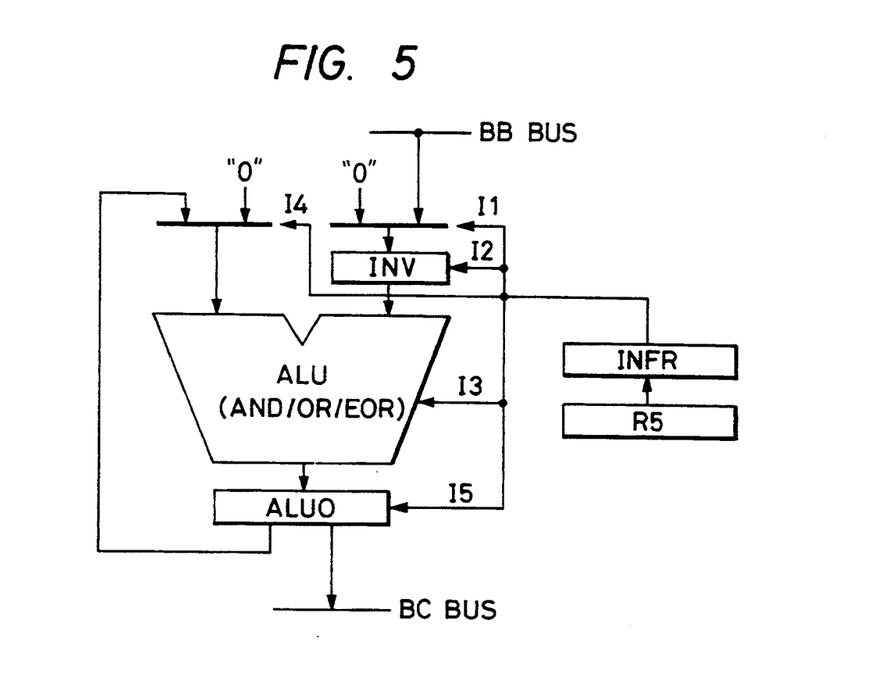
FIGS. 5, 6A and 6B are structural views of the arithmetic and logic unit ALU shown in FIG. 4.
Figure 6A:
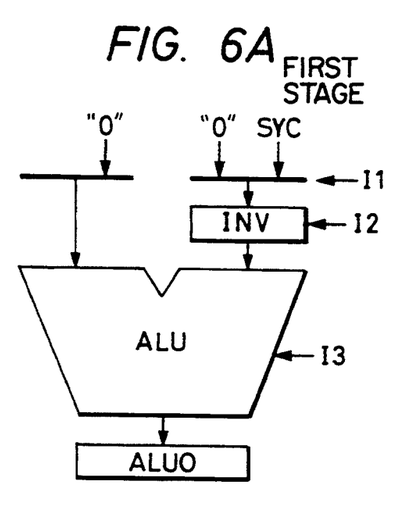
Figure 6B:
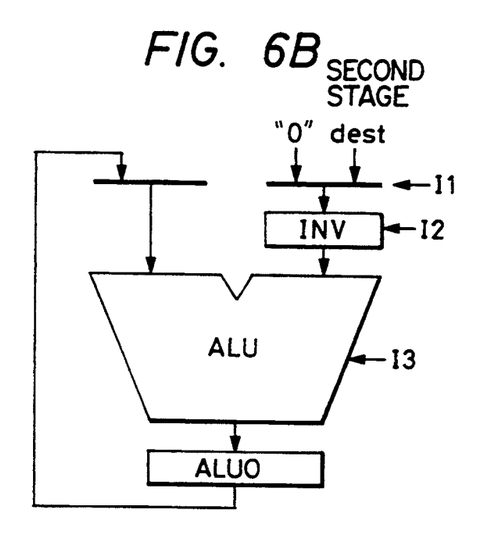

FIG. 5 shows the relationship between the arithmetic-and-logic unit ALU shown in FIG. 4 and the register R5 for controlling the former. Though not particularly limitative, the content of the general-purpose register is first stored in another register INFR, which outputs the control signals I1 to I5. Though not shown in FIG. 4, this register INFR is the same kind of register as the temporary registers DTE0 and the like and is disposed inside the execution unit. The control signal I1 is a signal for selecting the data on the BB BUS or one of the all-zero (0) data. The control signal I2 is a signal for controlling the operation of the inverter circuit INV and for making selection whether the input signal is outputted after inversion or without inversion. The control signal I3 selects the arithmetic functions of the arithmetic-and-logic unit ALU. This unit ALU has the arithmetic functions such as logical product (AND), the logical sum (OR) and the exclusive-or (XOR), and any one of these operations is selected by the control signal I3 The control signal I5 selects whether the data latched by the register ALUO is to be delivered to BC BUS or be fed back to the input side of the arithmetic-and-logic unit ALU. The control signal I4 selects the data fed back to the input side or one of the all-zero (0). The data selected by the control signal I1 is used as one of the input data of the arithmetic-and-logic unit ALU through the inverter circuit INV, and the data selected by the control signal I4 is used as the other input data to the arithmetic-and-logic unit ALU. The operation of this arithmetic-and-logic unit is divided into two stages. For example, when each of the operations listed in foregoing Table 2 is carried out, the first stage operation state is shown in FIG. 6A and the second stage operation state is shown in FIG. 6B.

TABLE 4

| | Selection by $I_1$ | Selection by $I_2$ | Selection by $I_3$ |
|---|---|---|---|
| 1 | 0 | NOT INVERSION | OR |
| 2 | 0 | NOT INVERSION | OR |
| 3 | 0 | NOT INVERSION | OR |
| 4 | 0 | NOT INVERSION | OR |
| 5 | src | INVERSION | OR |
| 6 | src | NOT INVERSION | OR |
| 7 | src | NOT INVERSION | OR |
| 8 | src | NOT INVERSION | OR |
| 9 | src | NOT INVERSION | OR |
| 10 | src | NOT INVERSION | OR |
| 11 | src | NOT INVERSION | OR |
| 12 | src | INVERSION | OR |
| 13 | src | INVERSION | OR |
| 14 | src | INVERSION | OR |
| 15 | src | INVERSION | OR |
| 16 | src | NOT INVERSION | OR |

TABLE 5

| | Selection by $I_1$ | Selection by $I_2$ | Selection by $I_3$ |
|---|---|---|---|
| 1 | 0 | INVERSION | OR |
| 2 | 0 | NOT INVERSION | OR |
| 3 | dest | INVERSION | OR |
| 4 | dest | NOT INVERSION | OR |
| 5 | 0 | NOT INVERSION | OR |
| 6 | 0 | NOT INVERSION | OR |
| 7 | dest | NOT INVERSION | AND |
| 8 | dest | NOT INVERSION | OR |
| 9 | dest | NOT INVERSION | XOR |
| 10 | dest | INVERSION | AND |
| 11 | dest | INVERSION | OR |
| 12 | dest | NOT INVERSION | AND |
| 13 | dest | NOT INVERSION | OR |
| 14 | dest | INVERSION | AND |
| 15 | dest | INVERSION | OR |
| 16 | dest | INVERSION | XOR |

Tables 4 and 5 illustrate in detail the operation conditions shown in FIGS. 6A and 6B, respectively. When, for example, the first calculation 1→dest shown in Table 2 is made, the control described in the first row of Table 4 is effected in FIG. 6A. In other words, the control signal I1 selects all-zero (0), which is used as one of the input data to the arithmetic-and-logic unit ALU without inversion. The other input data to the arithmetic-and-logic unit ALU is all-zero (0). The calculation function of this arithmetic-and-logic unit ALU is set to logical sum (OR) by the control signal I3 and the result of calculation is all-zero (0). Next, the control in the first row of Table 5 is made in FIG. 6B. In other words, all-zero (0) is selected by the control signal I1, then inverted to all-one (1) by the inverter circuit INV and used as one of the input data to the arithmetic-and-logic unit. The other input data to the arithmetic-and-logic unit ALU is the result of the calculation described above (all-zero). Since the calculation function of the arithmetic-and-logic unit ALU is set to the logical sum (OR) by the control signal I3, the result of the calculation is all-one (1). When this data is stored in the bit field on the destination side, the execution of the calculation 1→dest is complete.

Similarly, the tenth operation $\overline{dest}.AND.src \rightarrow dest$ is executed in the following way. The control in the 10th row of Table 4 is effected in FIG. 6A. In other words, the control signal I1 selects the data on BB BUS (in this case, the value of the bit field on the source side) src and this data is used as one of the input data to the arithmetic-and-logic unit ALU without inversion. The other input data to the arithmetic-and-logic unit ALU is all-zero (0). Since the calculation function of this arithmetic-and-logic unit ALU is set to the logical sum (OR), for example, by the control signal I3, the result of the calculation is the value of the bit field on the source side (src). Next, the control in the 10th row of Table 5 is effected in FIG. 6B. In other words, the control signal I1 selects the data on BB BUS (in this case, the value of the bit field on the destination side) dest, and this data is inverted by the inverter circuit INV (to $\overline{dest}$) and used as one of the input data of the arithmetic-and-logic unit ALU. The result of the calculation described above (src) is used as the other input data. Since the calculation function of the arithmetic-and-logic unit ALU is set to the logical product (AND) by the control signal I3, the result of calculation is $\overline{dest}$ AND src. When this data is stored in the bit field on the destination side, the execution of $\overline{dest}$ AND src is complete.

In this embodiment, the arithmetic-and-logic unit ALU and the like are directly controlled by the content of the register R5, but the present invention is not particularly limited to this embodiment. For example, the arithmetic-and-logic unit ALU, etc. may be controlled indirectly by the content of the general-purpose register R5. For instance, the content of the register R5 is supplied to the instruction decoder 4 or the like to obtain the control signals I1 to I5 from the micro ROM 2. In the embodiment described above, the control signal I1 is the selection signal for selecting the data on BB BUS or not, but it is not particularly limited thereto. For example, a supply source for supplying the data to the BB bus and the like may be controlled by this control signal I1. Incidentally, the value src of the bit field on the source side or the value dest of the bit field on the destination side is sent to BB BUS by the output latch register BSFO of the barrel shifter BSFO.

FIG. 8 shows in further detail the execution sequence of the step SI in the flowchart shown in FIG. 7. This step S1 consists of steps S01 to S12.

Incidentally, among the general-purpose registers $R_0$ to $R_{15}$ shown in FIG. 4, those with symbols Ra, Rb, Rx and Ry are registers for storing the source base address, the destination address, the offset value address and the bit field width, respectively. It is possible to designate the arbitrary number of the general-purpose registers $R_0$ to $R_{15}$ and to use them as these registers Ra, Rb, Rx and Ry.

At the first step S01, the value of the register Rx, that is, the address representing the storage position of the offset value is inputted to the address calculation unit AU through the bus BA or BB and 0 is also inputted to the unit AU by the constant input function, and the result of addition is stored in the register AUO.

At the second step S02, the address value (the offset value address) stored in the register AUO at the first step S01 is transferred to the register AOR and at the same time, a request-instruction is given to the I/O interface so as to fetch the data on the external data bus. Accordingly, the address value in the register AOR is outputted to the external address bus through the I/O interface and access is made to the external memory so that the content of the memory is outputted to the data bus. Then, the data read out from the memory, that is, the offset value Off, is fetched by the I/O interface.

At the step S03, whether or not the data fetched is determined is confirmed on the basis of the signal outputted from the I/O interface. Thus, the data is taken into the data input register DIR. At the same time, at the step S03, the value of the register Ra, that is, the source base address BAD, is inputted to the address calculation unit AU through the bus BA or BB and 0 is also inputted to the unit AU by the constant input function and the result of addition is stored in the register AUO.

Next, at the fourth step S04, the value of the register AUO described above (source base address) is transferred to the register AOR and further to the temporary register DTE0 through the bus BC.

When the result of the calculation of the address calculation unit is transferred from the register AUO to AOR in connection with other processings, it is also transferred automatically to the register AOT. Here, transfer of the result to the register AOT has not specific meaning at all. In parallel with the operation described above, 0 is inputted to the address calculation unit AU by the constant input function and the content of the data input register DIR (the offset value) is inputted after code expansion through the bus BB and the result of the calculation is stored in the register AUO. Furthermore, the holding value, that is, the bit field width WB, is supplied from the register Ry to the function block FB through the bus BA, and the function block FB masks the upper 27 bits other than the lower bits, with the result being stored in the register FBO. When expressed mathematically, extraction of only the lower five bits of the bit field width is equivalent to determination of the remainder of division of the bit field width by "32". Hereinafter, the lower five bits of the bit field width will be called the "end number WD*". Here, the end number WD* is determined in order to judge boundary crossing at the later-appearing step S09.

Next, at the step S06, the value of the register AUO, that is, the offset value Off, is transferred to the temporary register DTE1 through the bus BC. At the same time, the value of the register AUO (the offset value) and the value of the temporary register DTE0, that is, the value obtained by shifting the source base address BAD to the upper order side by three bits by the shifter SFT, are supplied to the address calculation unit AU, and the result of addition is stored in the register AUO. The reason why the source base address BAD is shifted by three bits to the upper order side is to expand the base address BAD, which is arranged in such a manner that the memory space can be divided and designated in a byte unit, is expanded so that the position inside the memory space can be designated in the bit unit. Therefore, what is stored in the register AUO at this time is the distance expressed by the bit number from the address 0 of the bit field to be determined. This distance will be called "L".

At the step S06, the value of the register AUO described above, that is, the sum of the offset value Off and the value obtained by shifting the base address to the upper order side by three bits, is transferred to the register AOT. On the other hand, the source base address BAD is inputted from the temporary register DTE0 to the address calculation unit AU through the bus BA, and the value obtained by shifting the offset value Off transferred from the temporary register DTE1 through the bus BB to the lower order side by three bits by the shifter SET is inputted and added to the source base address BAD, and the value obtained by masking the lower two bits of the result of addition is stored in the register AUO. At the same time, the value WD* in the register FBO, that is, the lower five bits of the bit field width, are transferred to the temporary register DTE3 through the bus BC.

In the above-mentioned case, the address calculation unit AU calculates the addition between the base address and the value obtained by shifting the offset value by three bits to the lower order side in order to determine the execution address of the byte unit which is the nearest to the start of the bit field as the object. The reason why the lower two bits of the result of addition are masked in the address calculation unit AU is to obtain the address of the bit field as the object as a whole or a 32-bit word containing its leading portion.

At the seventh step S07, the word address in the register AUO obtained in the manner described above is transferred to the address output register AOR and outputted to outside through the I/O interface. At the same time, an instruction requesting fetch of the data on the external data bus is given to the I/O interface. Therefore, fetch of the word containing the leading portion of the bit field to be determined is started. In parallel therewith, the address held by the register AUO is transferred to the temporary register DTE2 through the bus BC. The value L representing the bit position from the address 0 of the bit field obtained at the step S05 is supplied to the function block FB from the register AOT through the bus BA and the result is stored in the register FBO. Accordingly, the leading position Off* of the bit field (which is one of the offset values and will be hereinafter called a "secondary offset") from the word address containing the leading portion of the bit field obtained at the step S06 (which is in agreement with the base address when offset is below 31) is held by the register FBO.

Subsequently, at the step S08, the value Off* (secondary offset) in the register FBO described above is transferred to the temporary register DTE2 through the bus BC, and at the same time, the value WD* (the lower five bits of the bit field width) in the temporary register DTE3 is supplied to and added by the arithmetic-and-logic unit ALU through the buses BA and BB and the result of addition is stored in the register ALUO. Then, the constant "33" is set from the side of the control unit to the register CSB. The number "33" is the sum of the bit number "32" of one word and the number "1". Also, whether or not the data fetched, that is, the content of the bit field to be determined, is determined is confirmed on the basis of the signal from the I/O interface. If the data is determined, that data is taken into the data input register DIR.

At the next step S09, the value fetched from the I/O interface is transferred from the data input register DIR to the temporary register DTE2 through the bus BC. In parallel with this operation, the arithmetic-and-logic unit ALU subtracts the value "33" of the register CBS from the value of the register ALUO (Off* +WD*) and its result is stored in the register ALUO. Here, if the result of subtraction is positive, it means that the bit field bridges over two words and if the result is negative, it means that the bit field falls within one word.

At the step S09, the shifting direction and the shifting quantity of the bit shift processing to be carried out in the barrel shifter BSF at the next step are designated. More definitely, the instruction in the rightward direction is given to the barrel shifter counter BCNT and the value Off* in the register FBO is supplied as the shifting quantity to the barrel shift counter BCNT through the bus BA.

At the step S10, the value of the temporary register DTE2, that is, the content of the bit field fetched from the memory, is supplied to the barrel shift BSF through the bus BB and at the same time, 0 is inputted by the constant input function so taht the barrel shift counter BCNT executs the shift operation in accordance with the instruction and the result is stored in the register BSFO. Accordingly, the content of the bit field fetched is stored in the 32-bit register BSFO while being packed to the left or under the packed state from the upper bit side of the register in sequence as shown in FIG. 8. In parallel with this operation, the instruction of the shifting direction and shifting quantity to be executed at the next step in the barrel shifter BSF is given at this step S10. In other words, the instruction of the right shift is given to the barrel shifter counter BCNT and the bit field width WD* in the temporary register DTE3 is supplied as the shifting quantity through the bus BA.

At the step S11, the value of the register BSFO and "0" are inputted to the barrel shifter BSF, the shift operation is carried out in the designated direction and shift quantity and the result is stored in the register BFSO. When the content of the bit field stored in the register BSFO is shifted rightward by a distance corresponding to the field width WD*, the content of the bit field fetched is packed to the right end in the 32-bit register BSFO, or under the desired packed state from the lower order side of the register in sequence.

The content of the bit field thus obtained is stored at the next step S12 in one of the general-purpose registers Rb from the register BSFO through the bus BC.

Furthermore, when it is judged at the step S09 that the result, of subtraction between the sum of Off* and WD* and the constant "33" is positive and the bit field crosses over the boundary, the flow returns again to the step S08 from the step S12 and the procedures described above are repeated so that all the contents of the bit field crossing over a plurality of words are read out.

Figure 10:
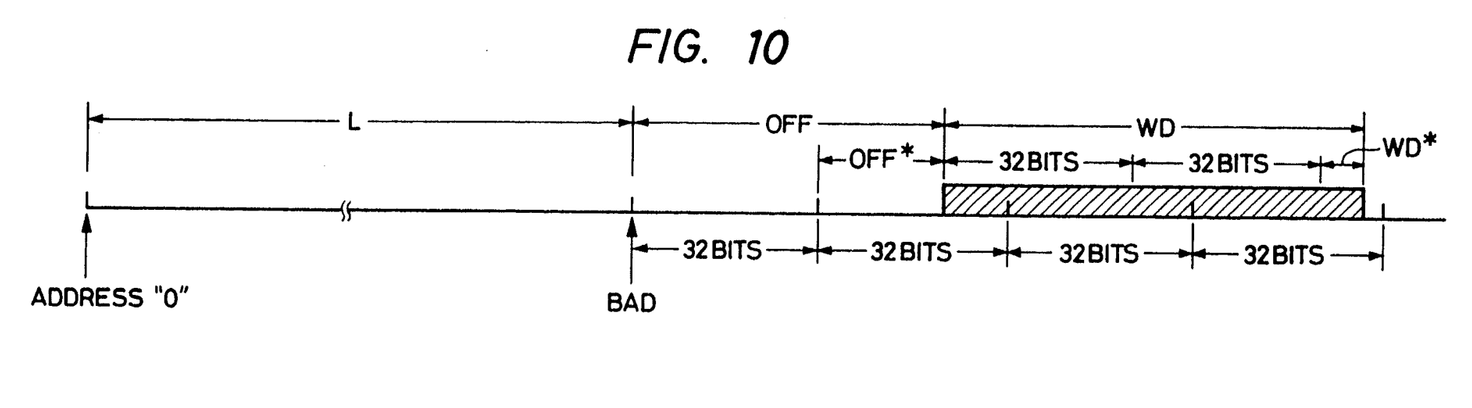
FIGS. 10 and 11 are explanatory views useful for explaining the operations in the execution sequence shown in FIG. 8.
Figure 11:
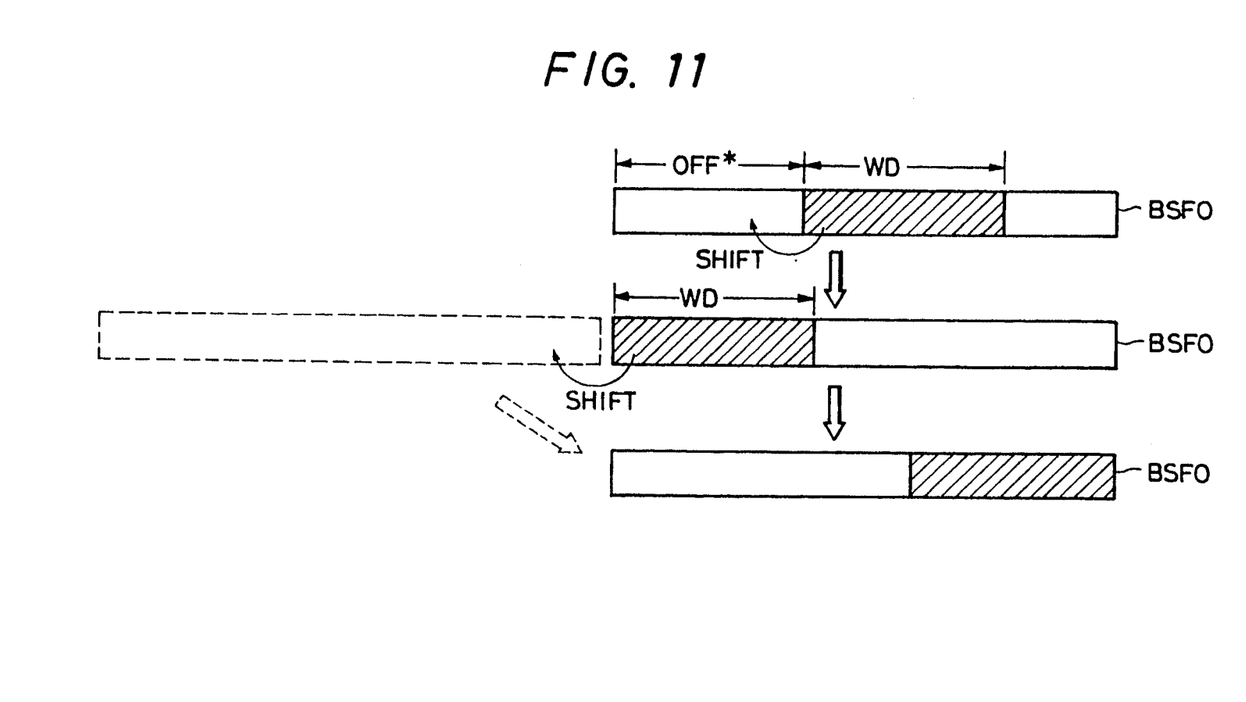

FIG. 10 shows the relationship between the offset value Off and the bit field width WD and the secondary offset Off* and the end number WD* in the micro-flow described above.

Incidentally, in the execution sequence of the bit field instruction without limitation in accordance with the micro-flow shown in FIG. 8, boundary crossing is judged depending upon whether the result of subtraction of the number "33" from the sum of the secondary offset Off* and the end number WD* of the bit field is positive or negative. Originally, judgement of boundary crossing should be made from the primary offset Off and the bit field width WD and the description of such a micro-flow can be made. However, it is obvious from FIG. 7, too, that the same result can be obtained when judgement of boundary crossing is made depending upon whether or not the sum of the secondary offset Off* and the end number WD* of the bit field exceeds the number "32" as in the embodiment described above as when judgement is made by adding the bit field width WD to the primary offset and then dividing the sum by 32 bits from the base address BAD.

Though the present invention has thus been described definitely with reference to the preferred embodiment thereof, the invention is not particularly limited thereto but can of course be changed or modified in various manners without departing from the scope and spirit thereof. For example, in the embodiment given above, the base address, offset and field width of the bit field and the kind of operation are given by the operands, but they may be given by an effective address unit in place of the operands.

The operation instruction of the present invention which designates the kind of operations by the operand may be disposed either in place of the conventional fixed operations or in combination with the latter.

Though the description given above primarily deals with the application of the invention to the instruction system of the microprocessor which constitutes the background and is the field of utilization of the invention, the present invention is not particularly limited thereto but can be applied to instruction systems of data processing systems in general such as computers and mini-computers of a program control system.

The effect brought forth by the typical example of the present invention is as follows.

Namely, the present invention can provide flexibility to the program and can easily develop a program for graphic processing, for example.

What is claimed is:

1. A data processing system comprising data storing means for storing changeable data which specifies a kind of operation to be performed, program storing means for storing macro-instructions within a fixable program, and a microprocessor, said microprocessor comprising:

instruction memory means for storing in sequential order macro-instructions, output from said program storing means, to be performed;

control means, coupled to the instruction memory means, for performing a control of said data processing system in accordance with a macro-instruction output from said instruction memory means;

rewritable memory means, coupled to said control means, for storing data transferred from said data storing means, said data being transferred from said data storing means to said rewritable memory means by said control means in response to a control performed by said control means in accordance with a first macro-instruction, said data being transferred from said data storing means to said rewritable memory means to modify a kind of operation to be performed by a second macro-instruction to be performed after said first macro-instruction, said macro-instructions stored in said instruction memory means includes said first and second macro-instructions; and instruction executing means, coupled to said control means and to said rewritable memory means, for dynamically performing a kind of operation specified by said data stored in said rewritable memory means instead of the kind of operation to be performed by the second macro-instruction in response to a control performed by said control means when the second macro-instruction has operation code information which specifies that the instruction executing means is to perform the kind of operation specified by the data stored in said rewritable memory means.

2. A data processing system according to claim 1, wherein each of said memory circuits is a rewritable memory means.

3. A data processing system according to claim 1, wherein said microprocessor is formed on a semiconductor chip.

4. A data processing system according to claim 3, wherein said kind of operation specified by said data stored in said rewritable memory means is one of an addition operation, a subtraction operation and a logical operation.

5. The data processing system according to claim 1, wherein said control means includes an instruction decoder for decoding the operation code information in a macro-instruction applied from the instruction memory means and wherein the instruction executing means includes an arithmetic-and-logic unit, decoder means coupled to the arithmetic-and-logic unit and to the rewritable memory means for, when data is stored in the rewritable memory means, preventing the decoding performed by the instruction decoder and determining the kind of the operation to be performed by the arithmetic-and-logic unit based on the data stored in the rewritable memory means.

6. The data processing system according to claim 5, wherein the kind of operation is one of an addition operation, a subtraction operation specified by said data stored in said rewritable memory means and a logical operation.

7. The data processing according to claim 6, wherein the rewritable memory means is a general-purpose register.

8. The data processing according to claim 7, wherein said control means includes:

micro-instruction generating means for generating a micro-instruction in response to the macro-instruction; and macro-instruction fetch means for fetching the macro-instructions from the instruction memory means.

9. The data processing according to claim 8, wherein the fixable program is stored in a read only memory and the data storing means is a random access memory.

10. The data processing according to claim 9, wherein said instruction memory means includes one of a cache memory and said macro-instruction fetch means.

11. A method of controlling a process for indicating a kind of operation to be performed in a microprocessor including instruction memory means for storing in sequential order macro-instructions within a fixable program to be performed, instruction executing means for performing an operation specified by operation code information of a macro-instruction output from said instruction memory means, memory means for storing data transferred from data storage means in which changeable data is stored, and control means for controlling operation of said instruction memory means, said instruction executing means and said memory means, comprising the steps of:

(a) transferring, by said control means, data which specifies a kind of operation to be performed by the instruction executing means, from the data storage means to the memory means upon execution of a first macro-instruction, said data being transferred from said data storage means to said memory means to modify a kind of operation to be performed by a second macro-instruction to be performed after said first macro-instruction;

(b) specifying, by said control means, a kind of operation to be performed by the instruction executing means in response to the data stored in the memory means; and (c) causing, by said control means, the instruction executing means to dynamically perform the kind of operation specified by the data stored in the memory means instead of the kind of operation to be performed by the second macro-instruction when operation code information of the second macro-instruction specifies that the operation to be performed by said instruction executing means is the kind of operation specified by the data stored in the memory means.

12. The method according to claim 11, wherein the steps are performed by control means which includes an instruction decoder for decoding the operation code information in the macro-instruction applied from the instruction memory and wherein the instruction executing means includes an arithmetic-and-logic unit, decoder means coupled to the arithmetic-and-logic unit and to the memory means for determining the kind of operation to be performed by the arithmetic-and-logic unit based on the data stored in the memory means.

13. The method according to claim 12, wherein the kind of operation is one of an addition operation, a subtraction operation and a logical operation.

14. The method according to claim 13, wherein the fixable program is stored in a read only memory and the memory means is a random access memory.

15. The method according to claim 14, wherein the instruction memory means includes one of a cache memory and a macro-instruction fetch means.

16. A microprocessor for use with data storage means in which changeable data is stored, comprising:

instruction memory means for storing in sequential order macro-instructions within a fixable program to be performed;

control means, coupled to said instruction memory means, for performing a control in accordance with a macro-instruction output from said instruction memory means;

information holding means, coupled to said control means, for storing data transferred from said data storage means, said data being transferred from said data storage means to said information holding means in response to a first macro-instruction to modify a kind of operation to be performed by a second macro-instruction to be performed after the first macro-instruction; and instruction executing means, coupled to said control means and to said information holding means, for dynamically performing the kind of operation specified by the data stored in the information holding means instead of the kind of operation to be performed by the second macro-instruction in response to control by said control means when the second macro-instruction has operation code information which specifies that the operation to be performed by said instruction executing means is the kind of operation specified by the data stored in the information holding means.

17. The microprocessor according to claim 16, wherein said control means includes an instruction decoder for decoding the operation code information in the macro-instruction applied from the instruction memory means and wherein said instruction executing means includes an arithmetic-and -logic unit, decoder means coupled to the arithmetic-and-logic unit and to said information holding means for determining the kind of operation to be performed by said arithmetic-and-logic unit based on the data stored in said information holding means without decoding by said instruction decoder.

18. The microprocessor according to claim 17, wherein the kind of operation is one of an addition operation, a subtraction operation and a logical operation.

19. A microprocessor according to claim 18, wherein said information holding means is a general-purpose register.

20. The microprocessor according to claim 18, wherein said control means includes:

micro instruction generating means for generating a micro-instruction in response to the macro-instruction; and macro-instruction fetch means for fetching the macro-instructions from said instruction memory means.

21. The microprocessor according to claim 20, wherein the fixable program is stored in a read only memory and the data storage means is a random access memory.

22. The data processing according to claim 21, wherein said instruction memory means includes one of a cache memory and said macro-instruction fetch means.

* * * * *